(12) United States Patent
Styron

(10) Patent No.: US 6,679,203 B2
(45) Date of Patent: *Jan. 20, 2004

(54) VARIABLE COMPRESSION RATIO INTERNAL COMBUSTION ENGINE USING FIELD-SENSITIVE FLUID

(75) Inventor: Joshua Putman Styron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

This patent is subject to a terminal disclaimer.

(21) Appl. No.: 10/127,177

(22) Filed: Apr. 23, 2002

(65) Prior Publication Data

US 2002/0148417 A1 Oct. 17, 2002

Related U.S. Application Data

(63) Continuation-in-part of application No. 09/761,156, filed on Jan. 16, 2001, now Pat. No. 6,394,048.

(51) Int. Cl.[7] .................................................. F02B 45/04
(52) U.S. Cl. .................... 123/48 B; 123/78 E
(58) Field of Search ............................ 123/48 R–48 D, 123/78 R–78 F

(56) References Cited

U.S. PATENT DOCUMENTS

| 2,134,995 | A |   | 11/1938 | Anderson |
| 3,139,760 | A |   | 7/1964  | Pfeifer |
| 4,084,553 | A |   | 4/1978  | Forde et al. |
| 4,241,705 | A |   | 12/1980 | Karaba et al. |
| 4,246,873 | A |   | 1/1981  | Lih-Liaw |
| 4,286,552 | A |   | 9/1981  | Tsutsumi |
| 4,370,901 | A |   | 2/1983  | Bolen |
| 4,934,347 | A |   | 6/1990  | Suga et al. |
| 5,036,226 | A |   | 7/1991  | Tonnu et al. |
| 5,146,879 | A |   | 9/1992  | Kume et al. |
| 5,277,281 | A |   | 1/1994  | Carlson et al. |
| 5,409,354 | A |   | 4/1995  | Stangroom |
| 5,417,185 | A |   | 5/1995  | Beattie |
| 5,562,068 | A |   | 10/1996 | Sugimoto et al. |
| 5,724,863 | A |   | 3/1998  | Kramer et al. |
| 5,752,891 | A |   | 5/1998  | Meckstroth et al. |
| 5,865,092 | A |   | 2/1999  | Woudwyk |
| 5,960,750 | A |   | 10/1999 | Kreuter |
| 6,036,226 | A |   | 3/2000  | Brown et al. |
| 6,394,048 | B1 | * | 5/2002  | Styron ...................... 123/48 B |

FOREIGN PATENT DOCUMENTS

| DE | 40 38 549 c  | 1/1992 |
| DE | 196 06 622 A1 | 8/1997 |
| DE | 198 58 245 A1 | 6/2000 |

* cited by examiner

*Primary Examiner*—Marguerite McMahon
(74) *Attorney, Agent, or Firm*—Carlos L. Hanze

(57) ABSTRACT

An internal combustion engine includes a variable compression ratio apparatus, a field-sensitive fluid coupled to the variable compression ratio apparatus, and a circuit for applying a field to the field-sensitive fluid to configure the variable compression ratio apparatus in accordance with a selected compression ratio of the internal combustion engine.

6 Claims, 6 Drawing Sheets

VARIABLE COMPRESSION RATIO INTERNAL COMBUSTION ENGINE USING FIELD-SENSITIVE FLUID

CROSS-REFERENCE TO RELATED APPLICATION

This application is a continuation-in-part of Ser. No. 09/761,156 filed on Jan. 16, 2001, now U.S. Pat. No. 6,394,048.

BACKGROUND OF THE INVENTION

1. Field of the Invention

The present invention relates generally to variable compression ratio internal combustion engines. More particularly, the invention relates to a variable compression ratio engine having a variable compression apparatus operable using a field-sensitive fluid.

2. Background Art

The "compression ratio" of an internal combustion engine is defined as the ratio of the cylinder volume of when the piston is at bottom-dead-center (BDC) to the cylinder volume when the piston is at top-dead-center (TDC). The higher the compression ratio, the higher the thermal efficiency of the internal combustion engine. This in turn results in improved fuel economy and a higher ratio of output energy versus input energy of the internal combustion engine.

In conventional internal combustion engines, however, the compression ratio is fixed and thus the engine efficiency cannot be optimized during certain operating conditions to improve fuel economy and engine power performance. Accordingly, so-called "variable compression ratio" (VCR) internal combustion engines have been developed having, for example, higher compression ratios during low load conditions and lower compression ratios during high load conditions. Conventional techniques for varying compression ratio include using "sub-chambers" and "sub-pistons" to vary the cylinder volume, see for example U.S. Pat. Nos. 4,246,873 and 4,286,552; varying the actual dimensions of all or a portion of a piston attached to a fixed length connecting rod, see U.S. Pat. No. 5,865,092; and varying the actual length of the connecting rod itself, see U.S. Pat. Nos. 5,724,863 and 5,146,879.

Many conventional techniques however rely on the use of complex and costly hydraulic control systems for varying the length of a connecting rod or height of a reciprocating piston. In U.S. Pat. No. 5,562,068, for example, a hydraulic system is used to vary the effective length of a connecting rod by rotating and selectively locking an eccentric ring located within the large end of the rod. When hydraulic pressure is released, the eccentric ring interlocks with the crank pin thus resulting in a longer effective rod length and therefore a higher compression ratio mode. When hydraulic pressure is applied, the eccentric ring locks with the connecting rod, thus resulting in a shorter effective rod length and therefore a lower compression ratio.

U.S. Pat. No. 5,960,750 similarly discloses a connecting rod having a rotatable eccentric ring actuated by a hydraulic control system. The connecting rod includes a mechanically actuated locking member for locking the eccentric ring in one of two positions. When actuated in a first direction, the locking member locks the eccentric ring in a position corresponding to a maximum effective length of the connecting rod, i.e., a high compression ratio mode. When actuated in a second direction, the locking member locks the eccentric ring in a position corresponding to a minimum effective length of the connecting rod, i.e., a high compression ratio mode.

U.S. Pat. No. 5,417,185 and Japanese Publication JP-03092552, which disclose rings disposed between the "small" end of a connecting rod and a corresponding piston pin for varying piston height, also utilize hydraulic control systems for operating an internal combustion engine in various compression ratio modes.

Accordingly, the inventor herein has recognized the need to provide an improved variable compression engine having a connecting rod that can be quickly and reliably operated without utilizing a hydraulic control system.

SUMMARY OF THE INVENTION

An internal combustion engine is provided having a variable compression ratio apparatus, a field-sensitive fluid coupled to the variable compression ratio apparatus, and a circuit for applying a field to the field-sensitive fluid to configure the variable compression ratio apparatus in accordance with a selected compression ratio of the internal combustion engine. Preferably, the field-sensitive fluid is a magnetorheological (MR) or electrorheological (ER) fluid.

In accordance with a preferred embodiment of the present invention, the engine includes an apparatus for selectively varying a compression ratio of an internal combustion engine, the apparatus having a bearing retainer disposed between a connecting rod and a crankpin of the engine, and wherein the bearing retainer includes an inner portion in communication with the crankpin and an outer portion in communication with the connecting rod such that the connecting rod is axially movable relative to the bearing retainer along a longitudinal axis of the connecting rod. A field-sensitive fluid is provided within the connecting rod for communicating with the bearing retainer so as to vary the effective length of the connecting rod. A circuit, which may for example include an electromagnet, is further provided for applying a field to the fluid so as to maintain the connecting rod at a position relative to the position of the bearing retainer. When commanded, the effective length of the connecting rod at top-dead-center is thus controllable in accordance with a desired compression ratio mode of the internal combustion engine. A reciprocating internal combustion engine is also provided having the above-described compression ratio apparatus.

An advantage of the above-described variable compression ratio apparatus is that transitions between two or more compression ratio modes can be accomplished quickly and reliably without requiring the rotation of an eccentric ring member, and without requiring the use of a complex and costly hydraulic control system. By using the inertial forces acting on the rod to vary the rod's effective length, and by using the field-sensitive fluid together with an applied magnetic or electric field to "lock" and "unlock" the rod length, transitions between compression ratio modes can be performed within a single engine cycle without reliance on a hydraulic control system.

In a related aspect of the present invention, a corresponding system is also provided having the above-described variable compression ratio apparatus. In accordance with a preferred embodiment, the system further includes at least one sensor for measuring an operating condition of the internal combustion engine, and an engine controller coupled to the internal combustion engine, the sensor and the variable compression ratio apparatus for generating, based on the measured operating condition of the internal combustion engine, a control signal required to configure the variable compression ratio apparatus in accordance with the desired compression ratio of the internal combustion engine.

A related method is also provided, the method including the steps of: measuring at least one operating condition of the internal combustion engine; axially moving the connecting rod relative to a corresponding bearing retainer along a longitudinal axis of the connecting rod, wherein the position corresponds to a selected compression ratio of the internal combustion engine, and wherein the bearing retainer is in communication with a field-sensitive fluid disposed within the connecting rod; and applying a field to the field-sensitive fluid to maintain the connecting rod at the position corresponding to the selected compression ratio.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
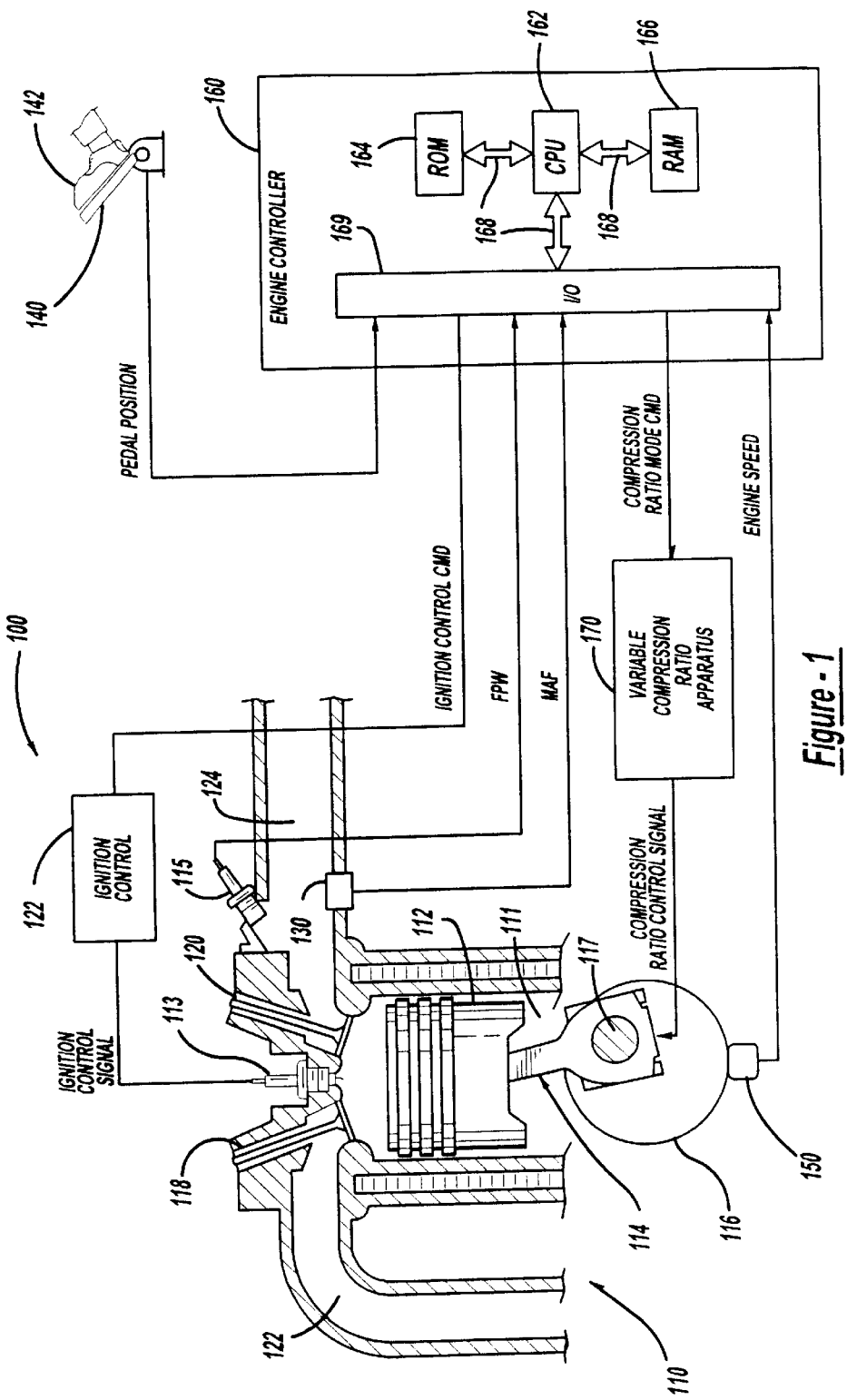
FIG. 1 is a diagram of an exemplary system for varying the compression ratio of an internal combustion engine.

FIG. 1 shows a diagram of a system for operating a variable compression ratio internal combustion engine in accordance with a preferred embodiment of the present invention. The engine 110 shown in FIG. 1, by way of example and not limitation, is a gasoline four-stroke direct fuel injection (DFI) internal combustion engine having a plurality of cylinders (only one shown), each of the cylinders having a combustion chamber 111 and corresponding fuel injector 113, spark plug 115, intake manifold 124, exhaust manifold 132 and reciprocating piston 112. The engine 110, however, can be any internal combustion engine, such as a port fuel injection (PFI) or diesel engine, having one or more reciprocating pistons as shown in FIG. 1. Each piston of the internal combustion engine is coupled to a connecting rod 114 on one end, and to a crankpin 117 of a crankshaft 116. The connecting rod 114 is preferably a fixed-length connecting rod, but is not so limited.

The reciprocating piston 112 is further coupled to a variable compression ratio apparatus 170 operated by an electronic engine controller 160 to vary the compression ratio of the engine. "Compression ratio", as known and understood in the art, is defined as the ratio of the volume in the cylinder 111 above the piston 112 when the piston is at bottom-dead-center (BDC) to the volume in the cylinder above the piston 112 when the piston 112 is at top-dead-center (TDC). Although the compression ratio apparatus 170 is described below as providing "high" and "low" compression ratios, the apparatus 170 can be modified for example to provide one or more intermediate compression ratios for an internal combustion engine. Accordingly, operation of the apparatus 170 in "high" and "low" compression ratio modes is not intended to limit the scope of the claimed invention.

Referring again to FIG. 1, the compression ratio apparatus 170 is operated to effect a change in the engine's compression ratio in accordance with one or more parameters such as engine load and speed. Such parameters are measured by appropriate sensors, such as a speed sensor 150, mass air flow (MAF) sensor 130 and pedal position sensor 140, which are coupled to the engine controller 160. The engine controller 160 includes a central processing unit (CPU) 162 having corresponding input/output ports 169, read-only memory (ROM) 164 or any suitable electronic storage medium containing processor-executable instructions and calibration values, random-access memory (RAM) 166, and a data bus 168 of any suitable configuration. The controller 160 receives signals from a variety of sensors coupled to the engine 110 and/or vehicle, and controls the operation of the fuel injector 115, which is positioned to inject fuel into a corresponding cylinder 111 in precise quantities as determined by the controller 160. Through ignition control module 122, the controller 160 also controls the operation of the spark plugs 113 in a known manner.

Figure 2A:
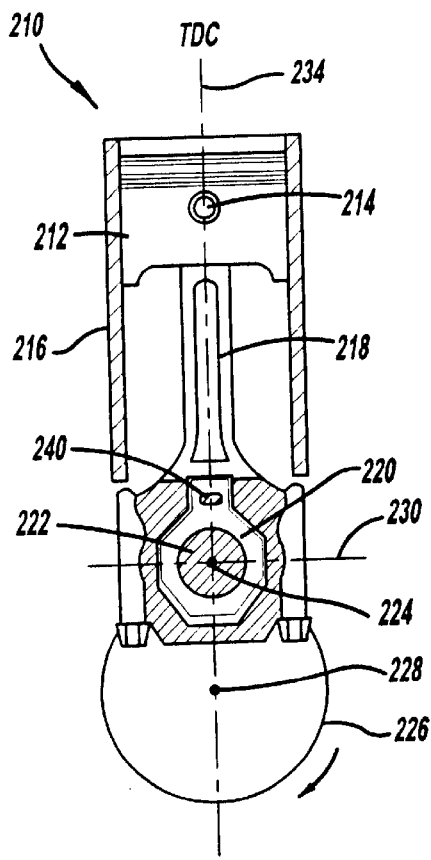
FIGS. 2A and 2B are exemplary diagrams showing low compression ratio operation of an internal combustion engine having a variable compression ratio apparatus.
Figure 2B:
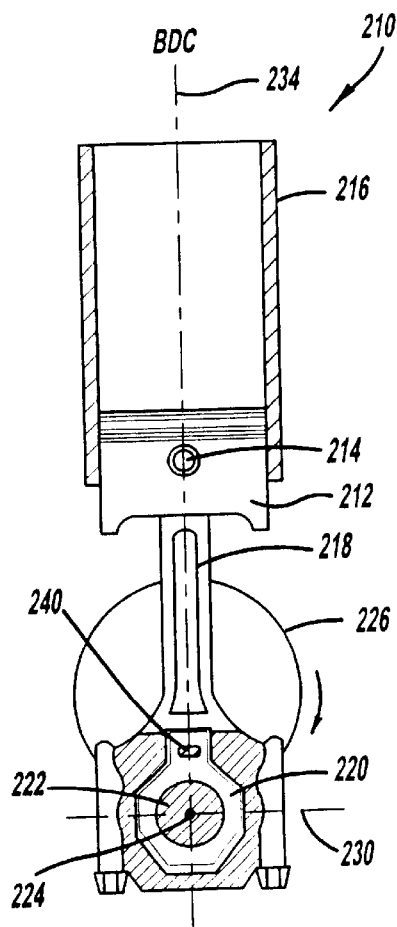
Figure 3A:
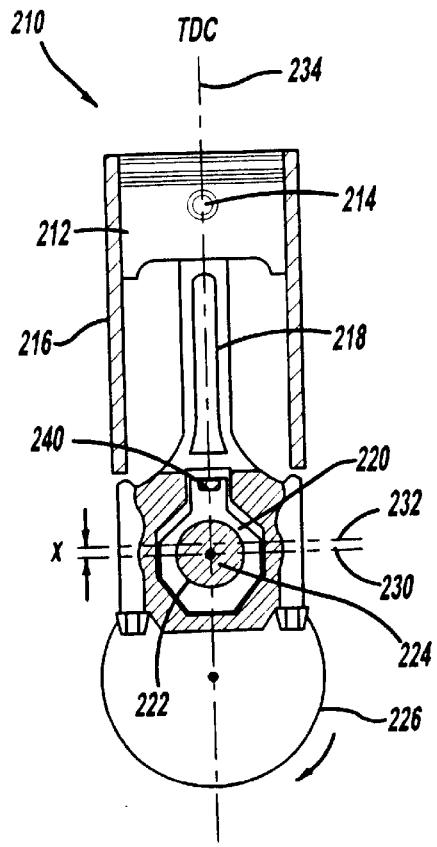
FIGS. 3A and 3B are exemplary diagrams showing high compression ratio operation of an internal combustion engine having a variable compression ratio apparatus.
Figure 3B:
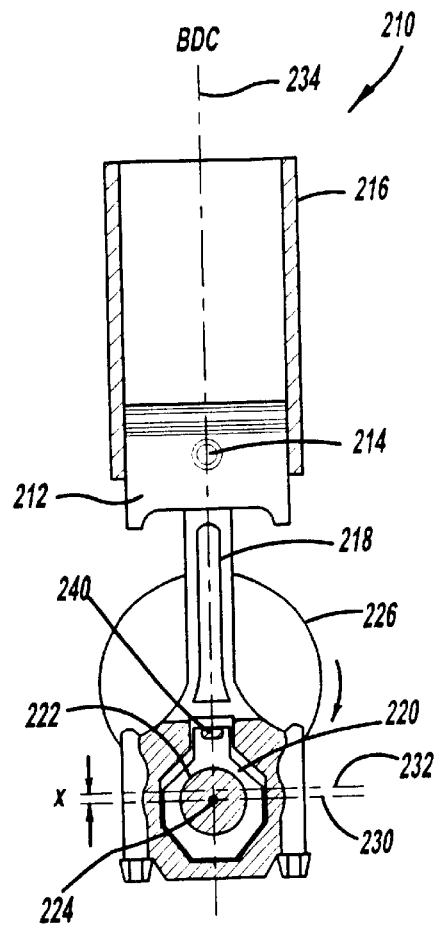

FIGS. 2A through 3B are exemplary diagrams illustrating the operation of an internal combustion engine having a variable compression ratio apparatus. FIGS. 2A and 2B show the piston 212 at top-dead-center (TDC) and bottom-dead-center (BDC) positions, respectively, corresponding to a "baseline" (retracted) low compression ratio mode position of a connecting rod 218. FIGS. 3A and 3B show the piston 212 at top-dead-center (TDC) and bottom-dead-center (BDC) positions, respectively, corresponding to an "extended" or high compression ratio mode position of the connecting rod 218.

As shown by way of example in the cut-away portions of FIGS. 2A an 2B, the variable compression ratio apparatus includes a bearing retainer 220 disposed between the connecting rod 218 and a crankpin 222, the crankpin having a centerline axis 224 extending out of the page and parallel to the axis of rotation 228 of a corresponding crankshaft 226. The bearing retainer 220 has a centerline axis 230 normal to the crankpin centerline axis 224, and likewise the connecting rod 218 has a centerline axis (shown as 232 in FIGS. 3A and 3B). When the connecting rod 218 is in the baseline position as shown in FIGS. 2A and 2B, which herein corresponds to a low compression ratio mode of the internal combustion engine, the bearing retainer centerline axis 230 is coincident or substantially coincident with the connecting rod centerline axis 232. When the connecting rod is in an extended, high compression ratio mode position as shown in FIGS. 3A and 3B, the bearing retainer centerline axis 230 is displaced with respect to centerline axis 232 of the connecting rod.

As further shown in FIGS. 2A through 3B, the bearing retainer 220 in accordance with the present invention includes an inner portion in communication with the crankpin 222 and an outer portion in communication with the connecting rod 218. The connecting rod 218 is moveable with respect to the outer portion of the bearing retainer in a linear fashion along a longitudinal axis 234 extending between the first and second ends of the connecting rod 218. The connecting rod centerline axis is thus selectively displaced with respect to the bearing retainer centerline axis, thus causing a change in the effective length of the connecting rod and the compression ratio of the internal combustion engine. Accordingly, during low compression ratio operation, the effective length of the connecting rod at TDC is equal to the baseline length of the connecting rod. During high compression ratio operation, the effective length is equal to the baseline length plus a delta x.

Figure 4:
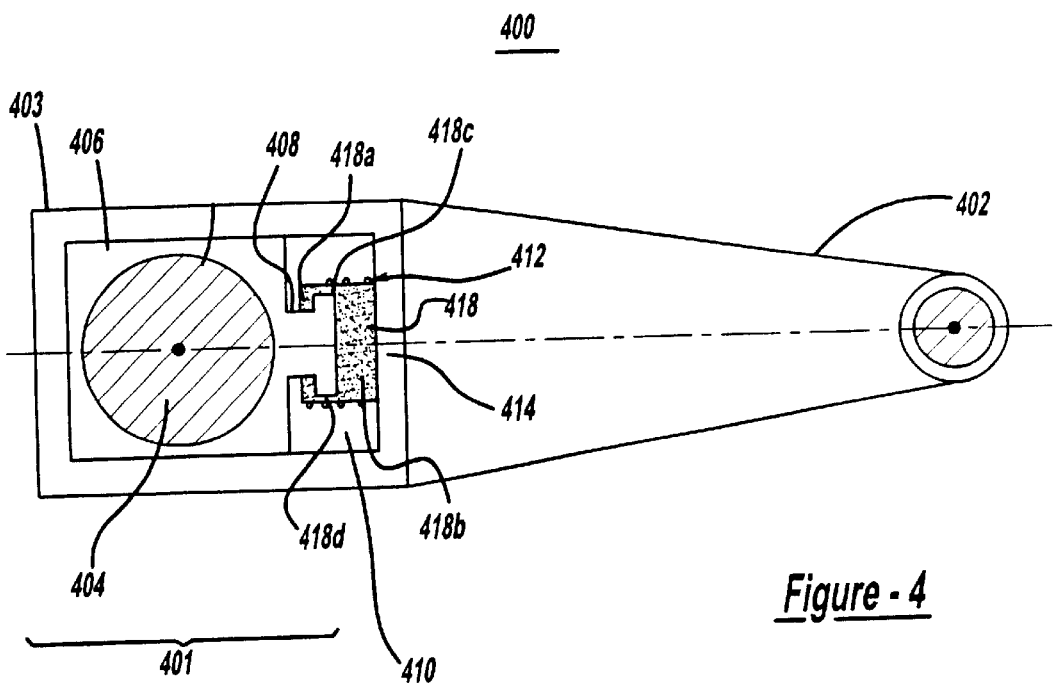
FIG. 4 is a sectional view of a connecting rod and variable compression ratio apparatus in accordance with a preferred embodiment of the present invention.

FIG. 4 shows a sectional view of a connecting rod 400 having a variable compression ratio apparatus 401 in accordance with a preferred embodiment of the present invention. The connecting rod 400 includes a "small" end 402 nominally attached to a piston pin 420 and a "large" end 403 nominally attached to a crankpin 404. The large end 403 includes an inner connecting rod portion 410 and a fluid reservoir 418. The variable compression ratio apparatus 401 includes a bearing retainer 406 in cooperation with the crankpin 404 and the fluid reservoir 418. The bearing retainer 406 includes a T-shaped post 408, which is fitted within the fluid reservoir 418 so as to partition the fluid reservoir 418 into first and second reservoir portions 418a and 418b separated by clearance regions 418c and 418d. Each of the reservoir portions 418a and 418b are filled with a field-sensitive fluid 414, the fluid having a variable viscosity controllable by an applied magnetic or electric field.

In a preferred embodiment, a magnetorheological (MR) fluid 414 is provided in the fluid reservoir and subjected to magnetic field applied via an electromagnetic coil 412 disposed within the connecting rod 400 in the vicinity of the fluid reservoir 418. Suitable MR fluids are known in the art and include for example Rheonetic™ products developed by Lord Corporation. Such fluids exhibit solid characteristics in the presence of an applied magnetic field, and as such can be used to vary the position of the bearing retainer with respect to the connecting rod. Alternatively, the coil 412 or equivalent magnetic field source or sources can be mounted outside the connecting rod 400 either on the connecting rod 400 itself or in the vicinity thereof on other engine components.

As such, when the coil 412 is energized, the MR fluid becomes too viscous to flow through the clearance regions 418c and 418d between the post 417 and the inner connecting rod portion 410 thus "locking" the connecting rod in a desired compression ratio mode position. Alternatively, an electrorheological (ER) fluid can be used with a potential source for setting the desired compression ratio mode of the connecting rod.

Figure 5:
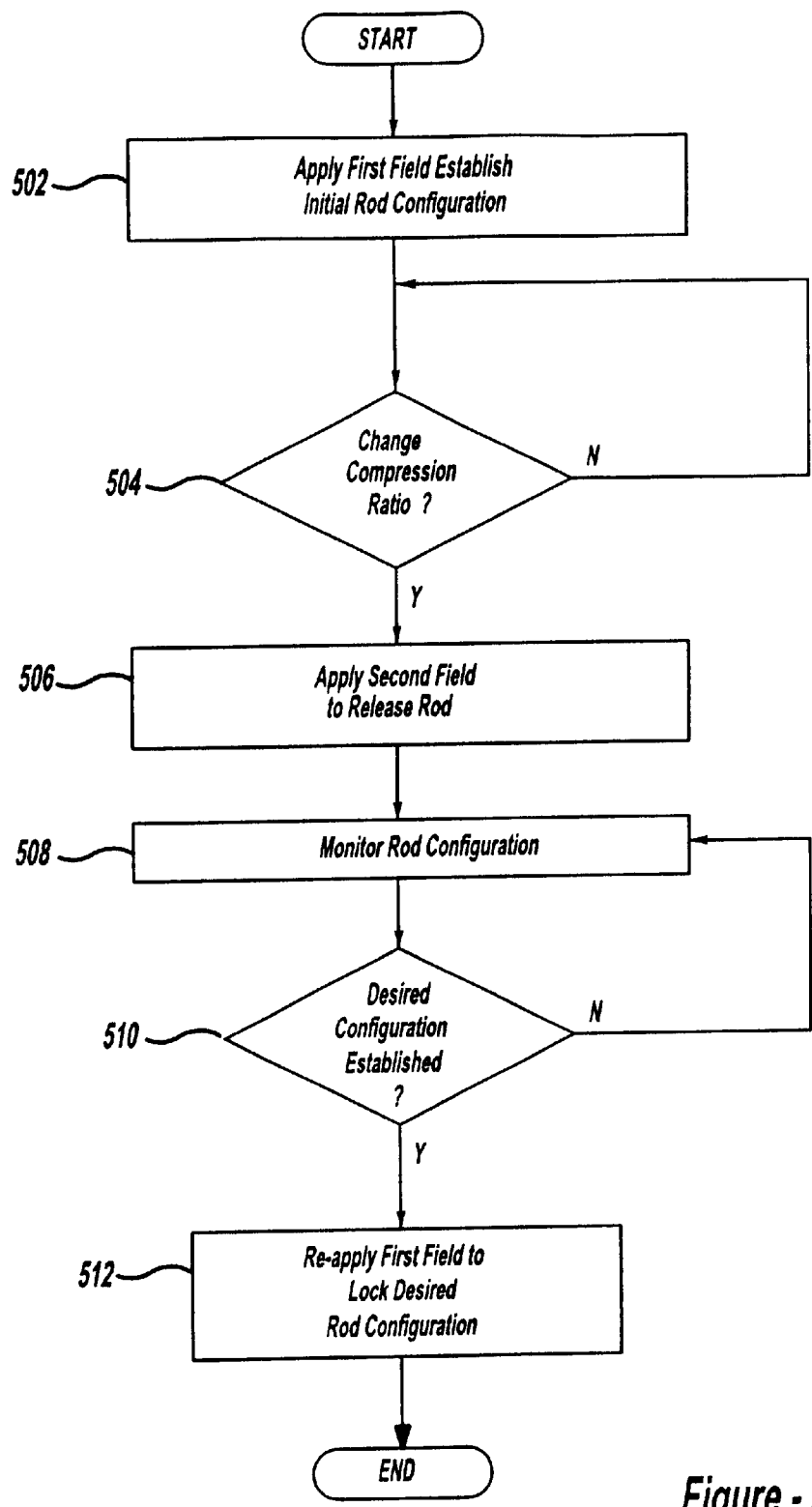
FIG. 5 is a flow diagram of a preferred method in accordance with the present invention.

FIG. 5 shows a flow diagram of a preferred method for operating the variable compression connecting rod of FIG. 4. In accordance with FIG. 5, a first field is applied to the field-sensitive fluid to "lock" the connecting rod in an initial or start-up compression ratio mode, step 502. During operation, if a change in compression ratio mode is required, step 504, then a second field is applied to "unlock" the connecting rod. At this point, the inertial forces acting on the rod will cause the connecting rod to move toward or away from the bearing retainer thus causing a change in the effective length of the rod. The position of the rod is then monitored, step 508, and when a desired position is established for a corresponding desired compression ratio mode, step 510, the first field is reapplied to lock the connecting rod in the desired position, step 512.

In order to vary the effective length of the connecting rod and thus the compression ratio of the engine, the control signals provided to variable compression ratio apparatus must be timed with the engine cycle in order to take advantage of the inertial forces acting on the rod. For example, the connecting rod will only be able to lengthen between the last half of the exhaust stroke and the first half of the intake stroke. Therefore, a transition from one compression ratio mode to another must occur during this time.

Figure 6:
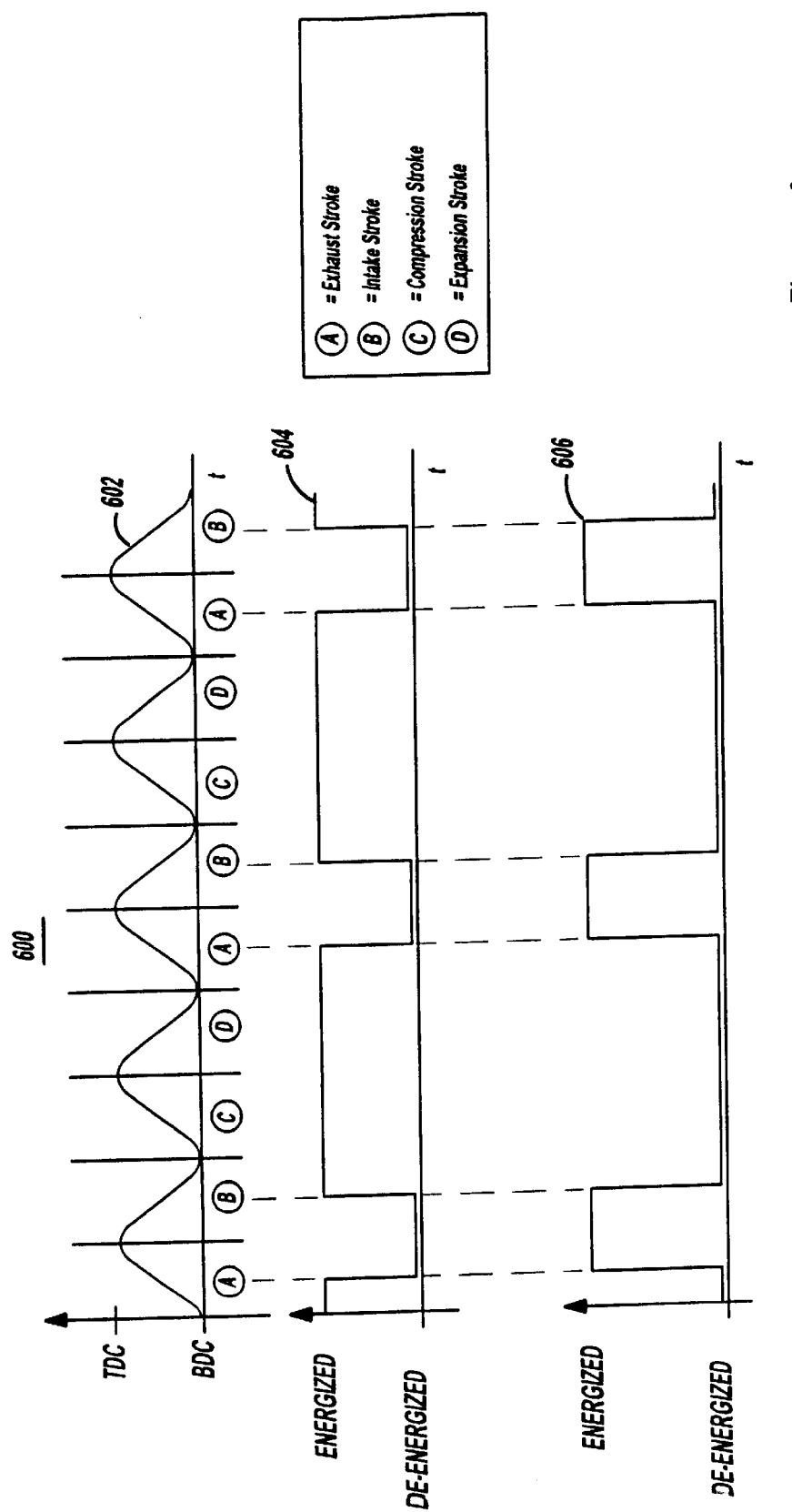
FIG. 6 is a timing diagram showing the operation of an exemplary variable compression ratio apparatus in high and low compression ratio modes.

FIG. 6 shows a preferred operation of a variable compression ratio connecting rod in high and low compression ratio modes. Curve 602 shows the movement of a piston between top-dead-center (TDC) and bottom-dead-center during typical four-stroke engine cycles each having an exhaust stroke A, an intake stroke B, a compression stroke C and an expansion stroke D. Curve 604 shows a control signal profile, for example as applied to the electromagnet 412 of FIG. 4, required to maintain the connecting rod in a high compression ratio mode (extended) position. Curve 606 by contrast shows a control signal profile required to maintain the connecting rod in a low compression ratio mode (retracted) position.

Referring again to FIG. 6, to keep the connecting rod in the extended, high compression position, the electromagnet in the case of FIG. 4 must be energized during the compression stroke C, the expansion stroke D, the first half of the exhaust stroke A, and the last half of the intake stroke B. To keep the rod in the retracted, low compression position, the electromagnet must be energized during the last half of the exhaust stroke A through the first half of the intake stroke B. If however the post region 408 is disposed on the side of the bearing retainer facing away from the small end of the connecting rod, the control signal profiles 604 and 606 are reversed. The control signal is preferably a pulse-width-modulated signal, which as shown in FIG. 6 can be used to operate the connecting rod in two compression ratio modes. If however intermediate compression ratios are desired, the control signal can be time (phase) shifted or the pulse durations altered to yield intermediate positions of the connecting rod.

Further, using a position sensor for feedback, the system can be advantageously controlled as a continuously variable compression ratio connecting rod capable of operating in a plurality of compression ratio modes.

In summary, by changing the effective length of the connecting rod using a field-sensitive fluid, the cylinder volume can be altered when a piston is at top dead center, and thus the compression ratio of an internal combustion engine can be altered without changing the engine's displacement. The cylinder volume can be increased by shortening the connecting rod, or decreased by lengthening the connecting rod, and then locking the connecting rod by applying the appropriate field to the a field-sensitive fluid. As such, the compression ratio of the engine can be decreased or increased as required.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method for operating an internal combustion engine having an apparatus for varying the compression ratio of the internal combustion engine, the method comprising:

selecting a desired compression ratio for the internal combustion engine;

coupling a field sensitive fluid to the apparatus; and applying a field to the field-sensitive fluid to configure the apparatus in accordance with the desired compression ratio of the internal combustion engine.

2. The method according to claim 1, wherein said coupling step comprises coupling a magnetorheological fluid to the apparatus and said field application step comprises applying a magnetic field to the magnetorheological fluid.

3. The method according to claim 1, wherein said coupling step comprises coupling an electrorheological fluid to the apparatus and said field application step comprises applying an electric field to the electrorheological fluid.

4. A system for operating an internal combustion engine having an apparatus for varying the compression ratio of the internal combustion engine, the method comprising:

control means for selecting a desired compression ratio for the internal combustion engine;

means for coupling a field sensitive fluid to the apparatus; and circuit means for applying a field to the field-sensitive fluid to configure the apparatus in accordance with the desired compression ratio of the internal combustion engine.

5. The system according to claim 4, wherein said field sensitive fluid comprises a magnetorheological fluid and said circuit means comprises a circuit for applying a magnetic field.

6. The system according to claim 4, wherein said field sensitive fluid comprises an electrorheological fluid and said circuit means comprises a circuit for applying an electric field.

* * * * *